US008171269B2

(12) United States Patent  
Rabinovitch et al.

(10) Patent No.: US 8,171,269 B2  
(45) Date of Patent: May 1, 2012

(54) BRANCH TARGET BUFFER WITH ENTRY SOURCE FIELD FOR USE IN DETERMINING REPLACEMENT PRIORITY

(75) Inventors: Alexander Rabinovitch, Kfar Yona (IL); Leonid Dubrovin, Kernei Shomron (IL)

(73) Assignee: Agere Systems Inc., Allentown, PA (US)

( * ) Notice: Subject to any disclaimer, the term of this patent is extended or adjusted under 35 U.S.C. 154(b) by 564 days.

(21) Appl. No.: 12/399,622

(22) Filed: Mar. 6, 2009

(65) Prior Publication Data

US 2010/0228957 A1    Sep. 9, 2010

(51) Int. Cl.  
*G06F 9/38* (2006.01)

(52) U.S. Cl. .... 712/238; 712/239; 712/240; 712/E9.057

(58) Field of Classification Search .................. None  
See application file for complete search history.

(56) References Cited

U.S. PATENT DOCUMENTS

| | | | | |
|---|---|---|---|---|
| 6,389,531 | B1 * | 5/2002 | Irle et al. | 712/237 |
| 7,613,910 | B2 * | 11/2009 | Yokoi | 712/239 |
| 7,895,422 | B2 * | 2/2011 | Moyer et al. | 712/239 |

* cited by examiner

*Primary Examiner* — Kenneth Kim  
(74) *Attorney, Agent, or Firm* — Hamilton, DeSanctis & Cha (57) ABSTRACT

Various embodiments of the present invention provide systems and methods for branch prediction. As an example, some embodiments of the present invention provides processor circuits that include a program address circuit, a branch target buffer, a branch prediction replacement circuit, and an execution pipeline. The branch target buffer includes a plurality of entries each associated with a respective change of flow instruction. Each entry includes an indication of an entry source and a next program address corresponding to the respective change of flow instruction. The branch prediction replacement circuit is operable to determine replacement priorities of the plurality of entries based at least in part on the entry source for each of the plurality of entries. The execution pipeline receives an executable instruction corresponding to one of the next program addresses.

20 Claims, 10 Drawing Sheets

BRANCH TARGET BUFFER WITH ENTRY SOURCE FIELD FOR USE IN DETERMINING REPLACEMENT PRIORITY

BACKGROUND OF THE INVENTION

The present inventions are related to systems and methods for performing branch prediction in a processing system, and more particularly to change of flow prediction processing.

A processing system generally executes instructions accessed from a computer readable medium. In a simplistic system, the instructions are stored in their order of execution allowing for pre-fetching the next instruction to be executed concurrent with execution of a current instruction. Such pre-fetching dramatically improves performance in a pipelined processing system.

The aforementioned performance increase is limited in more complex systems where non-sequential instructions are utilized. Where such non-sequential instructions are used, the next instruction to be executed is not necessarily the next instruction in sequence, but rather is determined based upon the result of executing the prior instruction. Where the result indicates a branch to other than the next sequential instruction, nullification of at least some pre-fetched instructions once the preceding instruction concludes is required. Such nullification results in a performance penalty where the next instruction to be executed is introduced to the pipeline only after the preceding instruction concludes. The severity of the performance penalty depends upon the percentage of times that a pre-fetched instruction must be nullified and the depth of any pipeline that must be flushed whenever a nullification is required. Some systems employ branch prediction algorithms that seek to reduce the percentage of nullifications. Such branch prediction algorithms, however, do not account for various changes in program flow and as such incur unnecessary performance penalties.

Hence, for at least the aforementioned reasons, there exists a need in the art for advanced systems and methods for reducing performance penalties associated with change of flow instructions.

BRIEF SUMMARY OF THE INVENTION

The present inventions are related to systems and methods for performing branch prediction in a processing system, and more particularly to change of flow prediction processing.

Various embodiments of the present invention provide processor circuits that include a program address circuit, a branch target buffer, a branch prediction replacement circuit, and an execution pipeline. As used herein, the phrase "branch prediction" is used in its broadest sense to mean any determination of the next address to be executed. Thus, branch prediction may be used to determine the address of the next instruction to be executed for any change of flow (COF) instruction. Such COF instructions include, but are not limited to a conditional branch instruction like an IF/THEN instruction or an unconditional branch instruction such as a JUMP instruction. Based upon the disclosure provided herein, one of ordinary skill in the art will recognize a variety of instructions that may be analyzed in accordance with different embodiments of the present invention. The branch target buffer includes a plurality of entries each associated with a respective change of flow instruction. Each entry includes an indication of an entry source and a next program address corresponding to the respective change of flow instruction. The branch prediction replacement circuit is operable to determine replacement priorities of the plurality of entries based at least in part on the entry source for each of the plurality of entries. The execution pipeline receives an executable instruction corresponding to one of the next program addresses.

In some instances of the aforementioned embodiments, the program address circuit further includes a branch prediction circuit. The branch prediction circuit accesses the branch target buffer and selects the next program address from one of the plurality of entries corresponding to an executing change of flow instruction. The executable instruction corresponding to one of the next program addresses is the selected next program address. In some cases, the branch prediction circuit updates the next program address for the one of the plurality of entries corresponding to the executing change of flow instruction based at least in part on a branch prediction algorithm. In various cases, updating the next program address includes setting the entry source for the one of the plurality of entries corresponding to the executing change of flow instruction to indicate the branch prediction circuit.

In one or more instances of the aforementioned embodiments, the program address circuit further includes a branch prediction circuit and a branch prediction load circuit. The branch prediction circuit is operable to load a first entry associated with a first change of flow instruction into the branch target buffer. The next program address of the entry is selected based on a branch prediction algorithm, and the entry source indicates the branch prediction circuit. The branch prediction load circuit is operable to load a second entry associated with a second change of flow instruction into the branch target buffer. The entry source indicates a source other than the branch prediction circuit. In some instances, the first change of flow instruction is the same as the second change of flow instruction. In some cases, the branch prediction replacement circuit indicates the replacement priority of the second entry as high priority prior to execution of the second change of flow instruction. As used herein, a higher priority is less likely to be replaced than a lower priority. In some cases, the replacement priority of the second entry is initially higher than that of the second entry. After execution of the second change of flow instruction, the replacement priority of the second entry is modified to be lower than the first entry. The replacement priority of entries including an entry source is determined based at least in part on a replacement algorithm. In one instance, the replacement algorithm is a least recently used replacement algorithm.

Other embodiments of the present invention provide methods for branch prediction. Such methods include providing a branch prediction circuit, a branch prediction load circuit, and a branch target buffer. The branch target buffer includes at least a first entry and a second entry. The first entry corresponds to a first change of flow instruction, includes a first next program address, and includes a first entry source indicating that the first next program address was received from the branch prediction circuit. The second entry corresponds to a second change of flow instruction, includes a second next program address, and includes a second entry source indicating that the second next program address was received from a source other than the branch prediction load circuit. The methods further include generating a replacement priority for the first entry and the second entry based at least in part on the first entry source and the second entry source, and replacing one of the first entry and the second entry in the branch target buffer based at least in part on the replacement priority.

In some instances of the aforementioned embodiments, replacing one of the first entry and the second entry results in replacing the second entry. In such cases, the methods may further include receiving a third entry from the branch prediction load circuit. The third entry corresponds to a third change of flow instruction, includes a third next program address, and includes a third entry source indicating that the third next program address was received from a source other than the branch prediction load circuit. The methods further include loading the third entry into the branch target buffer, and modifying the replacement priority based at least in part on the third entry source. The replacement priority indicates a priority of the third entry is greater than a priority of the first entry. Again, a higher or greater priority discourages replacement of an entry prior to replacement of entries with lower priority.

In various instances of the aforementioned embodiments, the methods further include executing the third change of flow instruction, and modifying the replacement priority based at least in part on the third entry source. The replacement priority indicates the priority of the first entry is greater than the priority of the third entry.

In some instances of the aforementioned embodiments, replacing one of the first entry and the second entry results in replacing the second entry. The methods further include receiving a third entry from the branch prediction load circuit. The third entry corresponds to a third change of flow instruction, includes a third next program address, and includes a third entry source indicating that the third next program address was received from the branch prediction load circuit. The methods further include loading the fourth entry into the branch target buffer, and modifying the replacement priority using a replacement algorithm applied to the first entry and the third entry. In some cases, the replacement algorithm is a least recently used algorithm.

Yet other embodiments of the present invention provide computer systems that include a processor, and a computer readable medium that includes at least a first change of flow instruction and a second change of flow instruction executable by the processor. The processor includes a program address circuit. The program address circuit includes a branch target buffer, a branch prediction circuit and a branch prediction replacement circuit. The branch prediction circuit is operable to load a first entry associated with a first change of flow instruction into the branch target buffer. The next program address of the entry is selected based on a branch prediction algorithm, and the entry source indicates the branch prediction circuit. The branch prediction load circuit is operable to load a second entry associated with a second change of flow instruction into the branch target buffer, and the entry source indicates a source other than the branch prediction circuit. branch prediction replacement circuit is operable to determine a replacement priority of the first entry and the second entry. The replacement priority indicates that the first entry should be replaced before the second entry prior to execution of the second change of flow instruction, and the replacement priority later indicates that the second entry should be replaced before the first entry prior after execution of the second change of flow instruction.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for performing branch prediction in a processing system, and more particularly to change of flow prediction processing.

Figure 1:
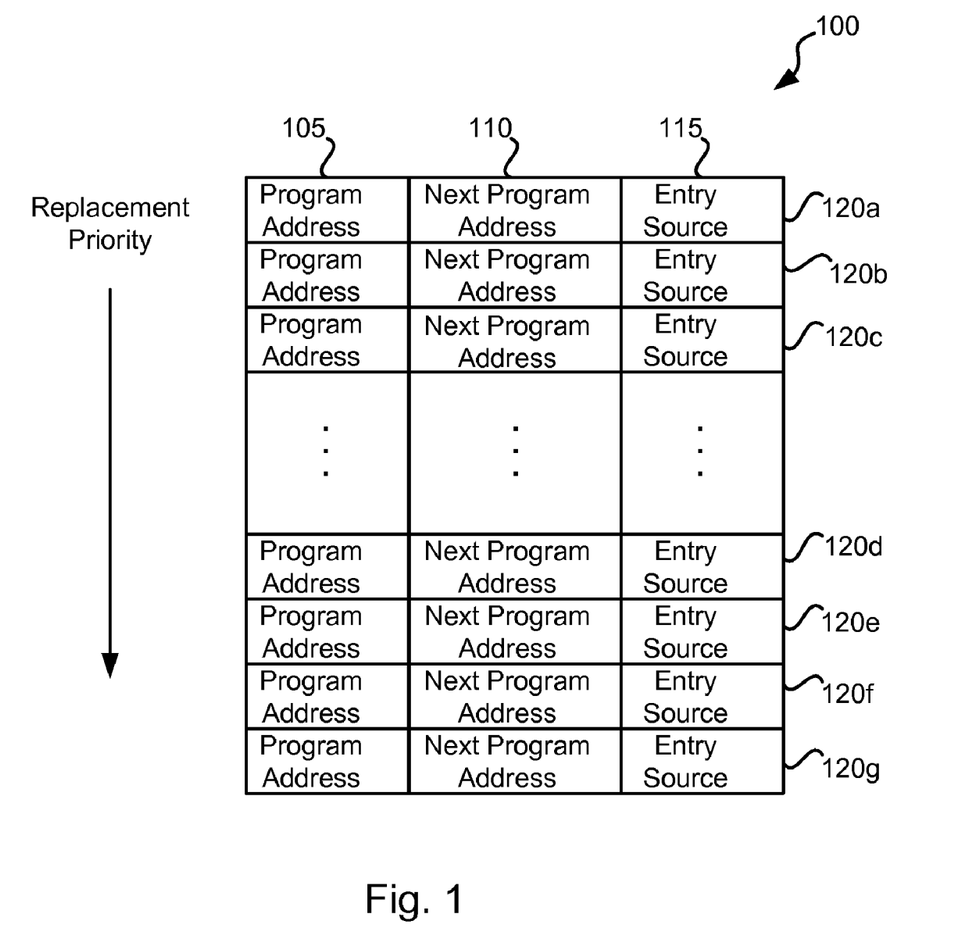
FIG. 1 shows an exemplary branch target buffer in accordance with one or more embodiments of the present invention.

Turning to FIG. 1, an exemplary branch target buffer 100 is shown in accordance with one or more embodiments of the present invention. Branch target buffer 100 includes a number of entries 120 that each correspond to a conditional instruction from an overall body of instructions. As used herein, the phrase "conditional instruction" is used in its broadest sense to mean any instruction where the next instruction to be executed depends upon the result of executing the conditional instruction. Thus, for example, a conditional instruction may be, but is not limited to, an "IF-THEN" instruction, a "FOR LOOP" instruction, or the like. Based upon the disclosure provided herein, one of ordinary skill in the art will recognize a variety of conditional instructions that may be used in relation to different embodiments of the present invention. It should be noted that while one or more embodiments of the present invention are described in relation to conditional branch instructions that the same embodiments may be used in relation to more generic change of flow instructions. Such change of flow instructions may including any instruction that results in the next instruction being other than a sequential instruction. Thus, for example, a change of flow instruction may be, but is not limited to, a conditional branch instruction or a non-conditional branch instruction. Based upon the disclosure provided herein, one of ordinary skill in the art will recognize a variety of change of flow instructions that may be used in relation to different embodiments of the present invention.

Each of the entries includes a program address of the respective conditional instruction in a field 105, a predicted next program address in a field 110, and an entry source indication in a field 115. The program address is the location (either virtual or physical) where the respective conditional instruction is accessed from a program memory. As an example, where thirty-two bit program addresses are used, field 105 is thirty-two bits. Based upon the disclosure provided herein, one of ordinary skill in the art will recognize a variety of address spaces that may be used in relation to different embodiments of the present invention, and corresponding widths of field 105.

The next program address of field 110 includes a prediction of the address of the next instruction to be executed after completion of conditional instruction maintained at the program address in field 110. The next program address may be determined using any branch prediction algorithm known in the art. As just one example, the branch prediction algorithm may identify the next program address as the next address executed after the respective conditional instruction was previously executed. Such an approach reduces the number of nullifications required where a conditional instruction goes to a particular next instruction more than fifty percent of the time. As some software loops execute hundreds of times before the loop is completed, it is common for conditional instructions to jump to a particular instruction ninety percent of the time or more. Thus, even the foregoing branch prediction algorithm yields improved performance. It should be reiterated that the forgoing branch prediction algorithm is merely exemplary, and that one of ordinary skill in the art will recognize that any branch prediction algorithm known in the art may be used in relation to different embodiments of the present invention.

The entry source indication of field 115 is used to identify whether the next program address for the respective entry is derived from a main branch prediction module or from a secondary source. In some cases, field 115 is a single bit with a logic '0' indicating a next program address derived from the main branch prediction module and a logic '1' indicating a next program address derived from another source. As more fully discussed below, the entry source indication is used to update the priority of a respective entry for purposes of replacement of the entry and/or use of the entry to determine a next program address from which an instruction is to be accessed.

As shown, entries 120 are stored in branch target buffer 100 in order of replacement priority. Thus, when a conditional instruction is encountered that is not referenced in branch target buffer 100 and it is to be maintained in branch target buffer 100, the entry 120 having the lowest replacement priority (i.e., entry 120g) is moved out of branch target buffer 100 to make room. The entry for the newly added instruction is prioritized in branch target buffer 100 in accordance with a replacement algorithm. Any replacement algorithm may be used to prioritize and effectuate replacement of entries 120 in branch target buffer 110. For example, in some embodiments of the present invention, a least recently used algorithm may be employed to determine which entry 120 in branch target buffer 100 is to be replaced when a new entry is presented. Based upon the disclosure provided herein, one of ordinary skill in the art will appreciate a variety of replacement algorithms that may be employed in relation to different embodiments of the present invention.

It should be noted that the priority of entries 120 may be implied by something other than their physical location in branch target buffer 100. For example, another field may be added to branch target buffer 100 that includes an indication of the priority for each of entries 120. When a change in priority is indicated, the field can be updated for each of the respective entries affected by the priority change. Based upon the disclosure provided herein, one of ordinary skill in the art will recognize a variety of approaches that may be used in accordance with various embodiments of the present invention to indicate and update the priority of entries 120.

Figure 2:
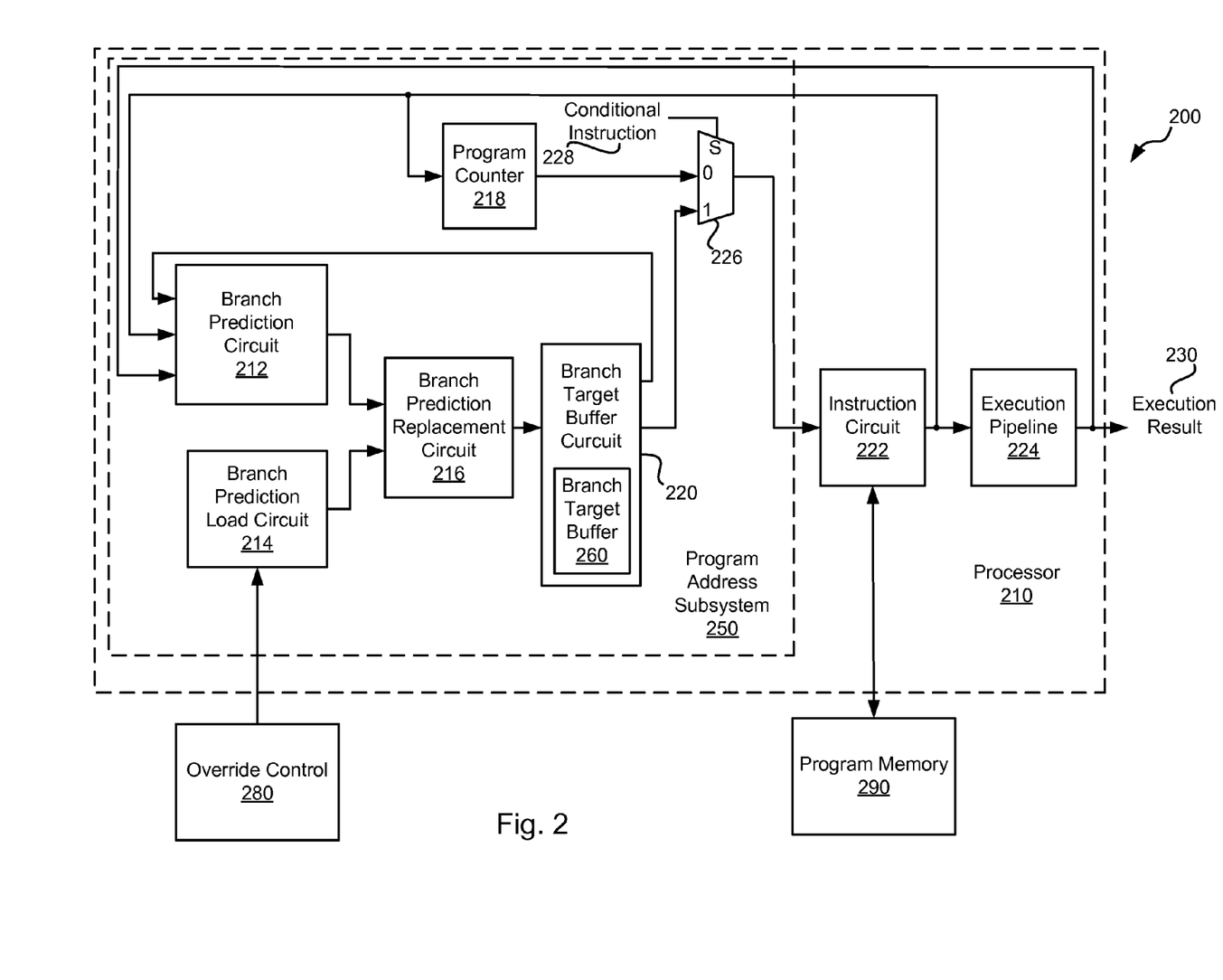
FIG. 2 depicts a processing system including a program address subsystem in accordance with various embodiments of the present invention.

Turning to FIG. 2, a processing system 200 is shown that includes a program address subsystem 250 in accordance with various embodiments of the present invention. Processing system 200 includes a processor 210 (shown in outer dashed lines), a program memory 290 and an override control 280. Program memory 290 may be any computer readable medium that is capable of maintaining information that is accessible to processor 210. As an example, program memory 290 may be, but is not limited to, a cache, a static random memory, a dynamic random memory, a read only memory, a flash memory, a magnetic storage medium such as, for example, a hard disk drive, combinations of the aforementioned memory types, and/or the like. Based upon the disclosure provided herein, one of ordinary skill in the art will recognize a variety of memory types that may be used in relation to different embodiments of the present invention. It should be noted that in some cases all or part of program memory 290 may be integrated with processor 210, or may be external to processor 210. Program memory 290 includes instructions executable by processor 210. Such instructions may be, for example, in the form of software, firmware and/or assembly, or machine code instructions as are known in the art.

Processor 210 includes a program address subsystem 250 (shown in inside dashed lines), an instruction pre-fetch circuit 222, and an execution pipeline 224. Instruction pre-fetch circuit 222 is operable to access the next instruction for execution from program memory 290, and to load the accessed instruction into an execution pipeline 224. Instruction pre-fetch circuit 222 accesses an instruction from program memory 290 based upon an address received from program address subsystem 250. Execution pipeline 224 may be any pipeline or series of execution modules known in the art. As an example, execution pipeline 224 includes an instruction decode circuit, an instruction execute circuit, a memory access circuit/register write circuit. Based upon the disclosure provided herein, one of ordinary skill in the art will recognize a variety of pipeline circuits that may be included in execution pipeline 224. Ultimately, execution pipeline 224 provides an execution result 230. Depending upon the instruction executed, execution result 230 may include information written back to a data memory (not shown), information written to one or more registers (not shown) internal to processor 210, and/or the address of the next instruction in program memory 290 that is to be executed.

Program address subsystem 250 is operable to determine the next instruction to be accessed from program memory 290 by instruction pre-fetch circuit 222. Program address subsystem 250 includes a program counter 218, an branch prediction circuit 212, a branch prediction load circuit 214, a branch prediction replacement circuit 216, and a branch target buffer module 220. Branch target buffer module 220 includes a branch target buffer 260 and some additional selection circuitry. Branch target buffer 260 may be and memory element storing one or more predictive branch entries, where each predictive branch entry includes an indication of standard or non-standard replacement priority. Thus, for example, branch target buffer 260 may be similar to that discussed above in relation to FIG. 1, where field 115 operates as the indication of standard or non-standard replacement priority. Based upon the disclosure provided herein, one of ordinary skill in the art will recognize a variety of arrangements and information that may be used in relation to branch target buffer 260.

Program counter 218 sequentially counts addresses based upon an input from instruction pre-fetch circuit 222. Program counter 218 may be any program counter known in the art. In some embodiments of the present invention, program counter 218 receives the address of the instruction most recently accessed from program memory 290 by instruction pre-fetch circuit 222 along with an instruction length. Program counter 218 calculates the next sequential program address by adding the received instruction length to the address of the previous instruction. Program counter 218 then provides the next sequential program address to branch target buffer module 220.

Branch prediction circuit 212 receives the address for the next instruction pre-fetched by instruction pre-fetch circuit 222. This address is compared against addresses of known conditional instructions that are maintained in branch target buffer 260. Where a match is identified, the next program address (i.e., the branch predicted address) associated with the match is accessed from branch target buffer 260 and is provided as a next predicted instruction address to a branch prediction replacement circuit 216. Branch prediction replacement circuit 216 updates the priority status and/or next program address of the matched instruction (i.e., program address) based upon a later available execution result 230 corresponding to the instruction. The updating process is dependent upon the particular replacement algorithm that is used to control replacement of entries in branch target buffer 260. For example, where a least recently used replacement algorithm is used, the priority status of the entry associated with the currently executing conditional instruction is updated to reflect that it is the most recently used, and other entries in branch target buffer 260 are modified to reflect any corresponding change in their priority status. Based upon the disclosure provided herein, one of ordinary skill in the art will recognize an appropriate priority status modification process that may be employed depending upon the selected replacement algorithm.

Where a match is found in branch target buffer 260, the next address from the entry corresponding to the match is selected. This includes asserting a conditional instruction control signal 228 such that the next address from the corresponding entry in branch target buffer 260 is provided via a multiplexer 226 as the next instruction address to instruction pre-fetch circuit 222.

Alternatively, where a match is not identified, conditional instruction control signal 228 is asserted such that an address output from program counter 218 is selected via multiplexer 226 to be provided as the next instruction address to instruction pre-fetch circuit 222. In addition, execution result 230 is awaited to determine whether the previously pre-fetched instruction is a conditional instruction. Where the instruction is not a conditional instruction, branch prediction replacement circuit 216 does not modify any entry in branch target buffer 260, and processing in instruction pre-fetch circuit 222 and execution pipeline 224 continues without modification.

In contrast, where the instruction is a conditional instruction, it is determined whether the next program address was appropriately taken from the address output of program counter 218, or if an alternative address was indicated upon execution of the conditional instruction. Where the address output of program counter 218 was appropriate, a correct next address guess was made and processing in instruction pre-fetch circuit 222 and execution pipeline 224 continues without modification. Where an incorrect next address guess was made, the pre-fetch circuit 222 and execution pipeline 224 are purged, the correct address is used by instruction pre-fetch circuit 222 to access program memory 290, and execution pipeline 224 is restarted.

In any case where the instruction is a conditional instruction not found in branch target buffer 260, an entry corresponding to the instruction is prepared for branch target buffer 260. The entry includes, for example, the program address of the instruction, the next program address based upon a branch prediction algorithm applied to the next program address identified in execution result 230, and an entry source. In this case, the entry source identifies the entry as having been provided by branch prediction circuit 212. An entry in branch target buffer 260 exhibiting the lowest priority is eliminated from branch target buffer 260, and the newly prepare entry is loaded into branch target buffer 260 by branch prediction replacement circuit 216. In addition, the priorities of the entries in branch target buffer 260 are modified depending upon the chosen replacement algorithm.

Entries in branch target buffer 260 may be modified using a load command that is controlled by branch prediction load circuit 214. This load command allows for loading an entry into branch target buffer 260 that corresponds to a particular conditional instruction and identifies a defined next address to be used. This allows for an override of the branch prediction algorithm implemented as part of branch prediction circuit 212 where a peripheral process or event indicates a known upcoming branch decision associated with the particular conditional instruction. This avoids the possibility of an incorrect next address guess and the performance penalty associated therewith.

The entry prepared by branch prediction load circuit 214 includes, for example, the program address of the particular conditional instruction, the forced next program address, and an indication that the source of the entry is other than branch prediction circuit 212. This new entry is provided along with the load command to branch prediction replacement circuit 216. In response, branch prediction replacement circuit 216 eliminates the entry in branch target buffer 260 exhibiting the lowest priority, and the newly prepared entry is loaded into branch target buffer 260. The priority of the newly loaded entry is assigned in accordance with a priority policy for entries received via a load command.

In one particular case, a policy automatically setting any entry received via a load command to the highest priority. In addition, the priorities of the entries in branch target buffer 260 are modified depending upon the chosen replacement algorithm. After a subsequent match of the new entry to an instruction pre-fetched by instruction pre-fetch circuit 222, the priority of the entry is modified to the lowest possible priority. By doing this, the peripheral indication of the next address for the particular conditional instruction is honored in place of any adaptively determined next address information for at least the next access of that instruction from program memory 290, and is then the most likely candidate for replacement in branch target buffer 260. This allows for subsequent preference of the adaptively determined next address. It should be noted that other approaches are possible in accordance with different embodiments of the present invention.

The load command triggering the previously described operation of branch prediction load circuit 214 may be based upon any information or event generated in processor 210 or external to processor 210. For example, the load command may be caused by an override control 280 that is external to processor 210. Override control may be, but is not limited to, a graphical user interface capable of receiving information from a user and displaying information to the user. When a particular user command is initiated via the graphical user interface, a load command dictating the next program address for a particular conditional instruction may be generated and updated to branch target buffer 260 as previously described. Alternatively, the load command may be caused by a processing module (not shown) that is internal to processor 210 and based on information available to processor 210. Base upon the disclosure provided herein, one of ordinary skill in the art will recognize a myriad of devices, modules, and/or information that may be used to trigger load commands to branch prediction load circuit 214.

Figure 3:
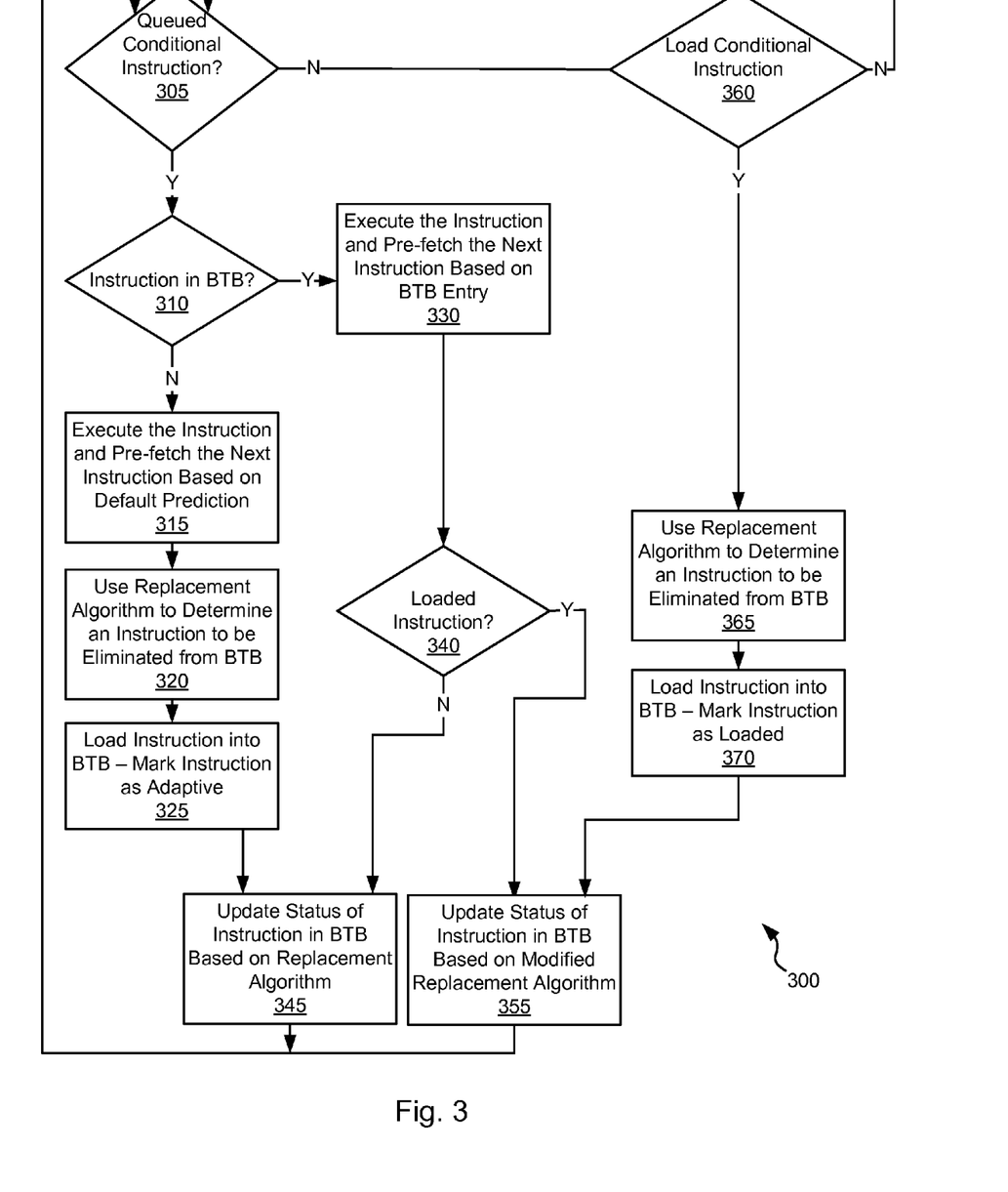
FIG. 3 is a flow diagram showing a branch prediction method in accordance with some embodiments of the present invention.

Turning to FIG. 3, a flow diagram 300 shows a branch prediction method in accordance with some embodiments of the present invention. Following flow diagram 300, it is determined whether a newly queued instruction is a conditional instruction (block 305). This may include, for example, determining whether a program address associated with an executing instruction is identified in a branch target buffer, and/or waiting for the instruction to be decoded and comparing the decoded instruction against known conditional instructions. Where a conditional instruction is identified (block 305), it is next determined whether the conditional instruction is in the branch target buffer (block 310). This can be determined, for example, by comparing the program address of a queued instruction with program addresses of the entries in the branch target buffer.

Where the newly queued instruction is not in the branch target buffer (block 310), the newly queued instruction is executed and a subsequent instruction pre-fetch is made from a default prediction address (block 315). Such a default prediction address may be, for example, an address available from a program counter in the processor executing the instructions. The program counter may provide the next sequential program address. In addition to executing the newly queued instruction (block 315), a replacement algorithm is used to determine which entry in branch target buffer to eliminate in order to make room for the new conditional instruction (block 320). Any replacement algorithm known in the art may be used including, but not limited to, a least recently used replacement algorithm or a least recently used and weighted replacement algorithm. Based on the disclosure provided herein, one of ordinary skill in the art will recognize a variety of replacement algorithms that may be used in relation to different embodiments of the present invention. Next, an entry for the new conditional instruction is formatted and stored to the branch target buffer (block 325). The entry includes an indication of what process caused the entry. In this case, the entry is marked as "Adaptive" meaning that the standard adaptive branch prediction process identified the instruction for inclusion in the branch target buffer. In some cases, in addition to the indication of what process caused the entry, the program address of the new conditional instruction is recorded along with the next program address. The next program address is predicted based upon a branch prediction algorithm. Any branch prediction algorithm may be used in relation to the different embodiments of the present invention. For example, the next program address may be the address that was generated by executing the new conditional instruction. The replacement algorithm is then used to assign/update priorities to the entries in the branch target buffer (block 345). Thus, for example, where a least recently used algorithm is utilized, the entry associated with the new conditional instruction is assigned the highest priority. The entry associated with the conditional instruction that was last accessed farthest in the past is assigned the lowest priority.

Alternatively, where the newly queued instruction is in the branch target buffer (block 310), the newly queued instruction is executed and a subsequent instruction pre-fetch is made from the next program address from the matching entry in the branch target buffer (block 330). This next program address may be the address selected by the branch prediction algorithm when the new conditional instruction was last executed, or may be a loaded address designed to force a predefined program branch. It is determined whether the next program address was selected by the branch prediction algorithm when the new conditional instruction was last executed (e.g., marked "adaptive"), or whether it is a loaded address (e.g., marked "loaded") (block 340). Where the next program address was selected by the branch prediction algorithm when the new conditional instruction was last executed (block 340), the replacement algorithm is used to assign/update priorities to the entries in the branch target buffer (block 345). Thus, for example, where a least recently used algorithm is utilized, the entry associated with the new conditional instruction is assigned the highest priority. The entry associated with the conditional instruction that was last accessed farthest in the past is assigned the lowest priority.

Alternatively, where the next program address was loaded (block 340), a modified replacement algorithm is used to assign/update priorities to the entries in the branch target buffer (block 355). As an example, the replacement priority of the new conditional instruction is set to the lowest priority and a least recently used replacement algorithm may be used to set the priorities of the other non-loaded (i.e., "adaptive") entries in the branch target buffer. In this way, once a conditional instruction that includes a loaded next program address has executed, its priority is set such that it will most likely be the next entry eliminated from the branch target buffer.

Where the newly queued instruction is not a conditional instruction (block 305), it is determined whether a load of a conditional instruction is indicated (block 360). As discussed above in relation to FIG. 2, a conditional instruction load may be generated by a process either internal to the processor or external to the processor, and is generally caused when a defined next program address for a conditional instruction becomes known. The result of loading a conditional instruction is to override any next address generated by a branch prediction algorithm, and where properly used can result in increased performance. Where a load of a conditional instruction is indicated (block 360), the replacement algorithm is used to determine which entry in branch target buffer to eliminate in order to make room for the new conditional instruction (block 365). An entry corresponding to the conditional instruction being loaded is then formatted and loaded into the branch prediction buffer (block 370). The modified replacement algorithm is used to assign/update priorities to the entries in the branch target buffer (block 355). Following the example above, the replacement priority of the new conditional instruction is set to the highest priority and a least recently used replacement algorithm may be used to set the priorities of the other non-loaded (i.e., "adaptive") entries in the branch target buffer. In this way, prior to its next execution, the conditional instruction associated with the newly added, loaded entry will remain in the branch target buffer until it is executed. Once executed, as previously explained, its priority is dramatically lowered encouraging it to be purged from the branch target buffer.

Figure 4A:
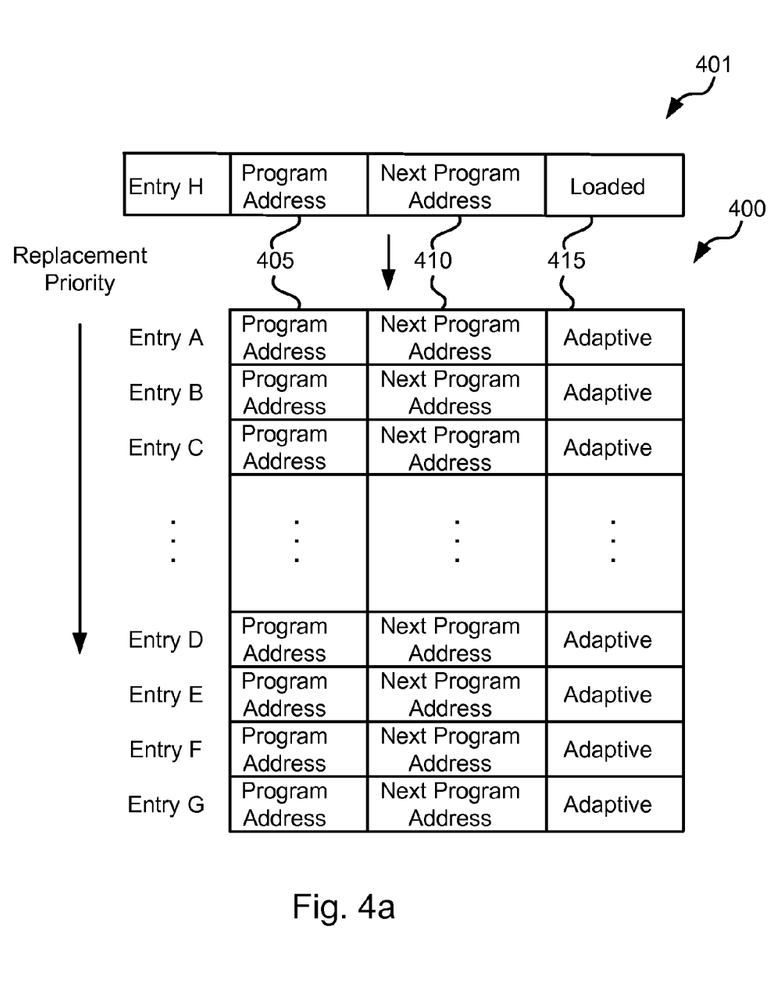
FIGS. 4a-4c show an exemplary branch target buffer update process in accordance with some embodiments of the present invention.
Figure 4B:
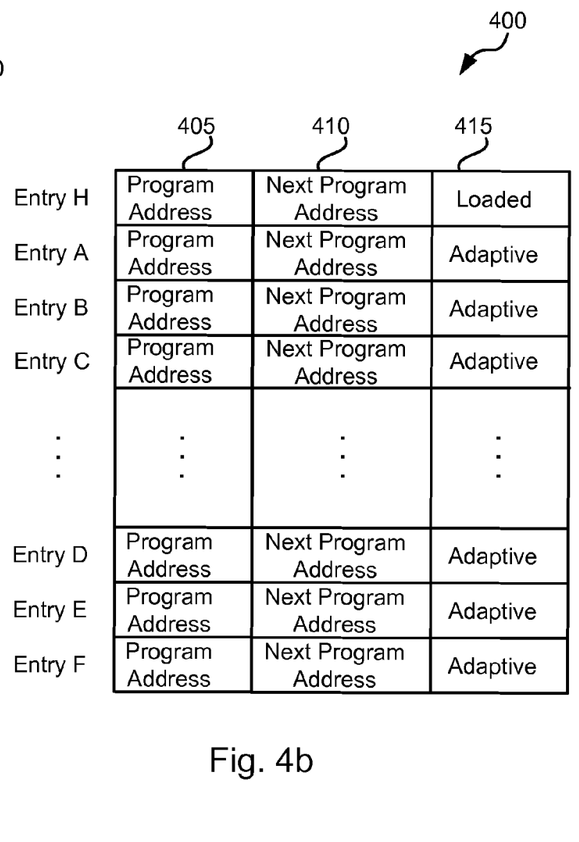
Figure 4C:
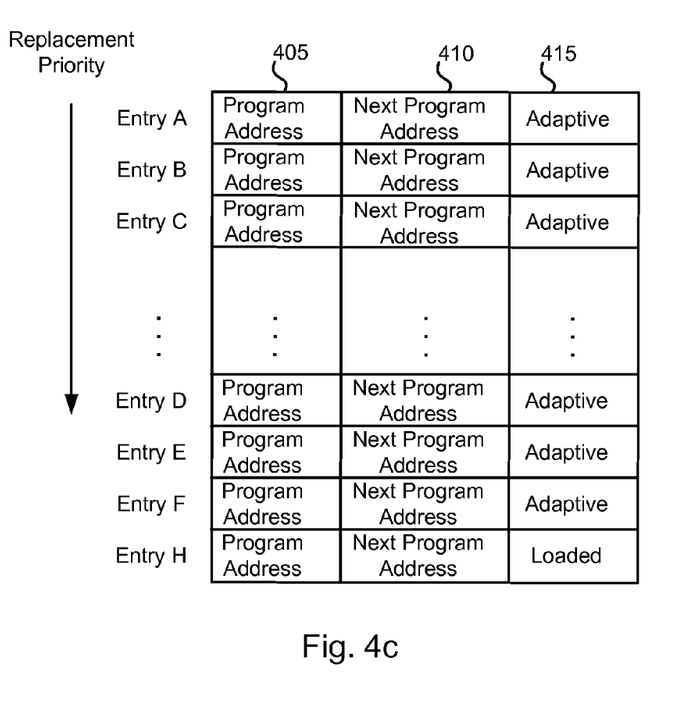

Turning to FIGS. 4a-4c, an exemplary branch target buffer update process is depicted in accordance with some embodiments of the present invention. FIG. 4a shows an initial branch target buffer 400 that includes a number of entries (i.e., entries A, B, C, D, E, F, G), and a new entry 401 associated with an entry (i.e., entry H) generated by a process/module other than the standard branch prediction circuit. Each entry corresponds to a conditional instruction from an overall body of instructions; and each of the entries includes a program address of the respective conditional instruction in a field 405, a predicted next program address in a field 410, and an entry source indication in a field 415. Fields 405, 410, 415 correspond to fields 105, 110, 115, respectively, that were described above in relation to FIG. 1. The entry source of entries A, B, C, D, E, F, G all indicate that the respective next program address was generated using the standard branch prediction algorithm (i.e., "adaptive"). In contrast, the entry source of entry H indicates that it was not generated by the standard branch prediction algorithm (i.e., "loaded"). This indication causes entry H to be treated differently for priority replacement purposes than the treatment applied to the other entries.

As shown in FIG. 4b, branch target buffer 400 is depicted at a time after entry H is written to the buffer and before a subsequent execution of the conditional instruction (identified by the program address in field 405). At this juncture, entry G has been eliminated from branch target buffer 400 to make room for entry H, and entry H has been assigned the highest priority to help assure that it remains in branch target buffer 400 at least until it is executed with the loaded next program address. FIG. 4c shows branch target buffer 400 where the next conditional instruction executed is that associated with entry H. As entry H was "loaded" and not "adaptive" its priority is treated differently from that of the other entries. In this case, the priority of entry H is assigned to the lowest possible priority, and the priority of all of the other entries is raised in accordance with a replacement algorithm. As such, entry H is likely to be eliminated from branch target buffer 400 when a new conditional instruction is encountered or another load process is effectuated. This process of raising and lowering priorities for a "loaded" entry allows for branch prediction for the associated conditional instruction to be used on a one time basis. Said another way, branch prediction can be used on an exception basis without otherwise modifying other branch prediction algorithms and/or replacement algorithms using in the process.

Figure 5A:
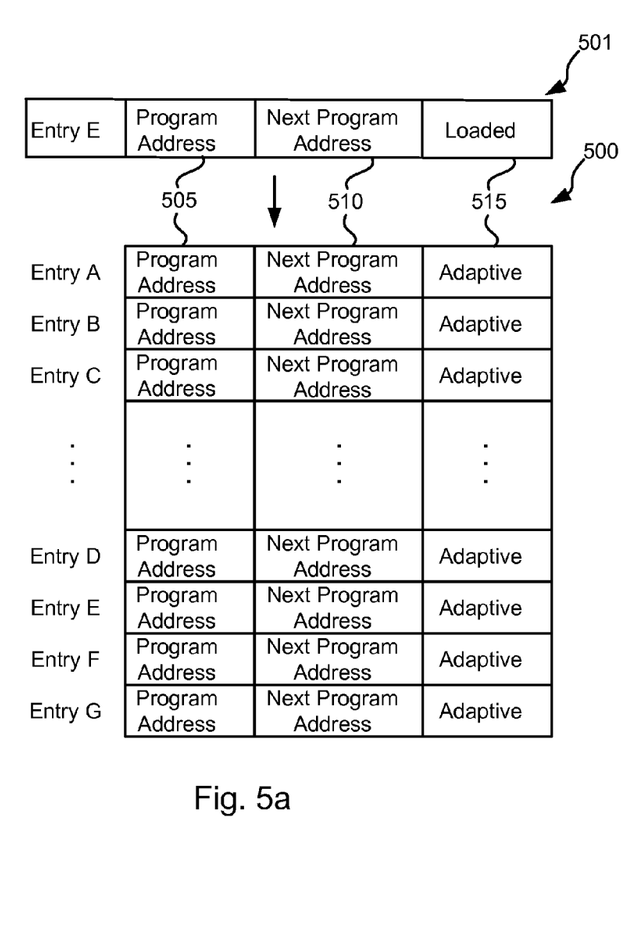
FIGS. 5a-5c show an exemplary branch target buffer update process in accordance with other embodiments of the present invention.
Figure 5B:
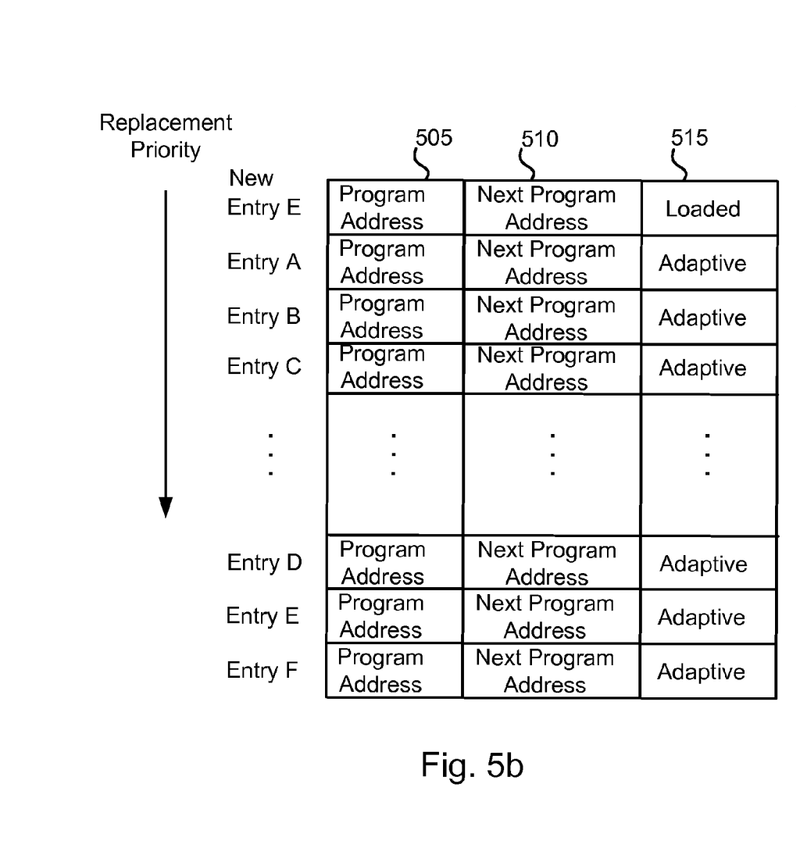
Figure 5C:
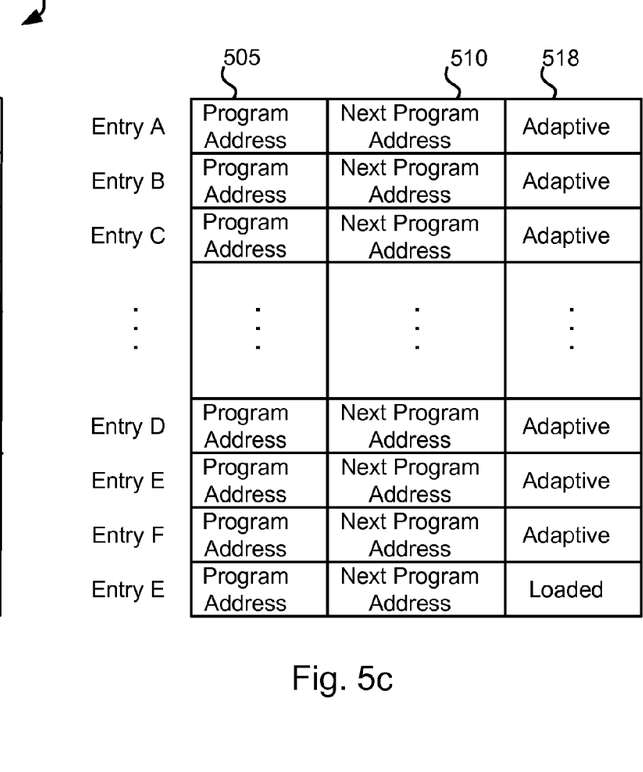

Turning to FIGS. 5a-5c, another exemplary branch target buffer update process is depicted in accordance with various embodiments of the present invention. In this case, a conditional instruction is associated with two distinct entries. One of the entries is a "load" entry and the other is an "adaptive" entry. It should be noted that while in this case two entries associated with the same conditional instruction are allowed to coexist, in other embodiments of the present invention, only one entry associated with a given conditional instruction is allowed at any given time. In such a case, where a loaded entry is presented that includes a conditional instruction already represented in the branch target buffer, the previous entry is modified to reflect the loaded entry. Based upon the disclosure provided herein, one of ordinary skill in the art will recognize a variety of other coexistence/replacement approaches that may be used in relation to different embodiments of the present invention.

FIG. 5a shows an initial branch target buffer 500 that includes a number of entries (i.e., entries A, B, C, D, E, F, G), and a new entry 501 associated with an entry (i.e., a new entry H) generated by a process/module other than the standard branch prediction circuit. Each entry corresponds to a conditional instruction from an overall body of instructions; and each of the entries includes a program address of the respective conditional instruction in a field 505, a predicted next program address in a field 510, and an entry source indication in a field 515. Fields 505, 510, 515 correspond to fields 505, 510, 515, respectively, that were described above in relation to FIG. 1. The entry source of entries A, B, C, D, E, F, G all indicate that the respective next program address was generated using the standard branch prediction algorithm (i.e., "adaptive"). In contrast, the entry source of the new entry E indicates that it was not generated by the standard branch prediction algorithm (i.e., "loaded"). This indication causes the new entry E to be treated differently for priority replacement purposes than the treatment applied to the other entries.

As shown in FIG. 5b, branch target buffer 500 is depicted at a time after the new entry E is written to the buffer and before a subsequent execution of the conditional instruction (identified by the program address in field 505). At this juncture, entry G has been eliminated from branch target buffer 400 to make room for the new entry E, and the new entry E has been assigned the highest priority to help assure that it remains in branch target buffer 500 at least until it is executed with the loaded next program address. Of note, the other entry E is maintained in branch target buffer with its respective, lower replacement priority. In this situation, where there are two entry E's, the next time the conditional instruction associated with both entry E's is pre-fetched, the next program address is taken from the highest priority entry E (i.e., the new entry E).

FIG. 5c shows branch target buffer 500 where the next conditional instruction executed is that associated with both entry E's. As the new entry E was "loaded" and not "adaptive" its priority is treated differently from that of the other entries. In this case, the priority of the new entry E is assigned to the lowest possible priority, and the priority of all of the other entries is raised in accordance with a replacement algorithm. As such, the new entry E is likely to be eliminated from branch target buffer 500 when a new conditional instruction is encountered or another load process is effectuated. Where the conditional instruction associated with both entry E's is to be executed before the new entry E is eliminated from branch target buffer 500, the next program address is again taken from the highest priority entry E (i.e., the previous entry E). This process of raising and lowering priorities for a "loaded" entry allows for branch prediction for the associated conditional instruction to be used on a one time basis. Said another way, branch prediction can be used on an exception basis without otherwise modifying other branch prediction algorithms and/or replacement algorithms using in the process.

Figure 6A:
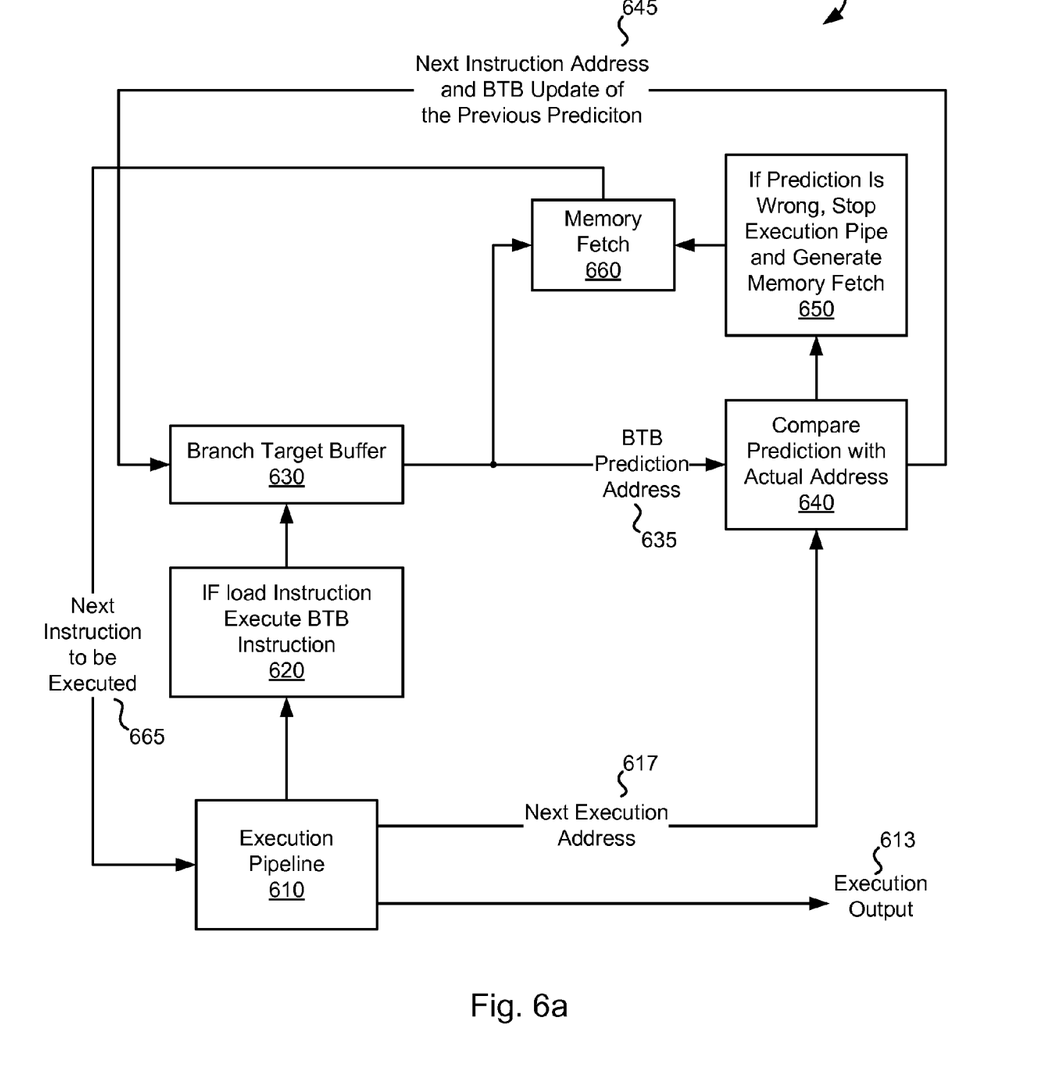
FIGS. 6a-6b are process flow diagrams showing an approach for reordering next address instructions in accordance with various embodiments of the present invention.
Figure 7A:
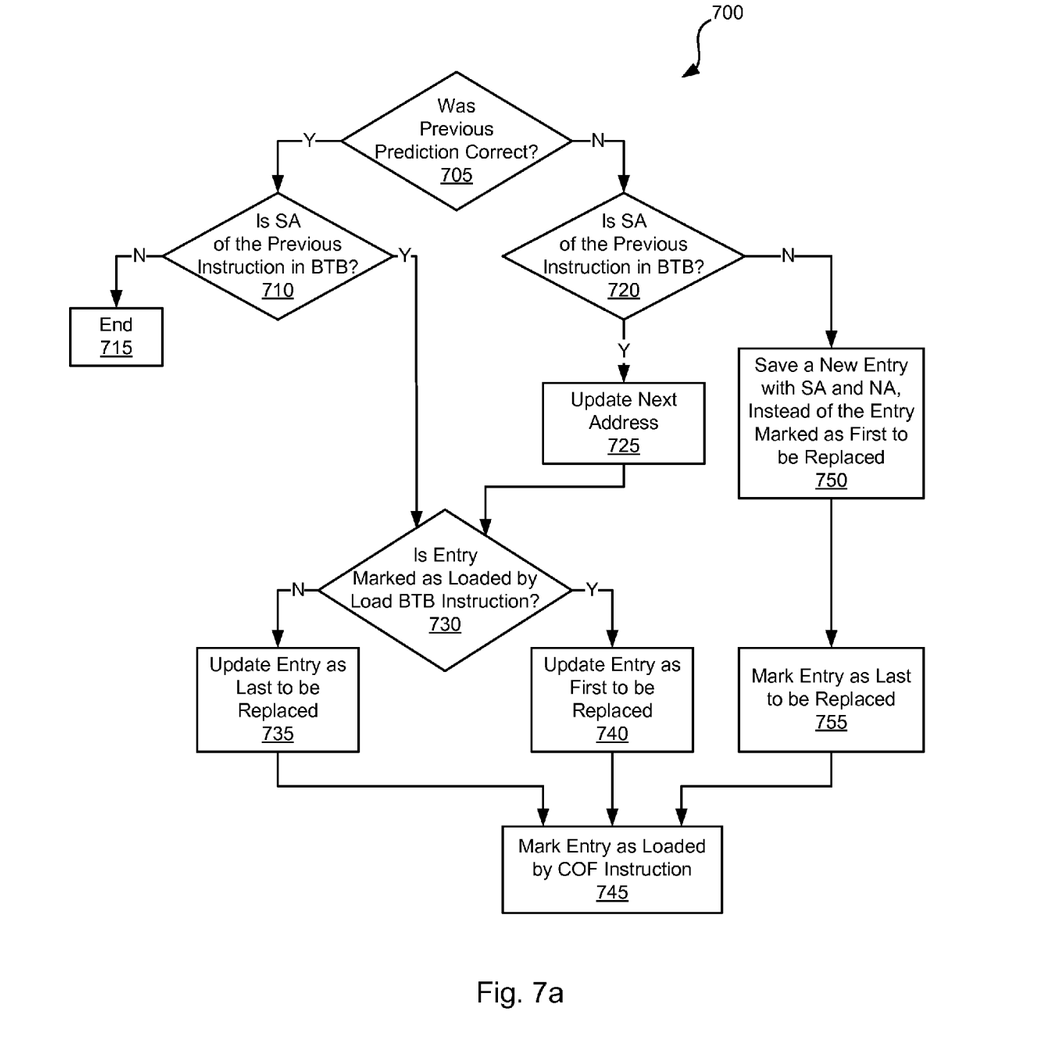
FIGS. 7a-7b are flow diagrams showing an address update process in accordance with various embodiments of the present invention.
Figure 7B:
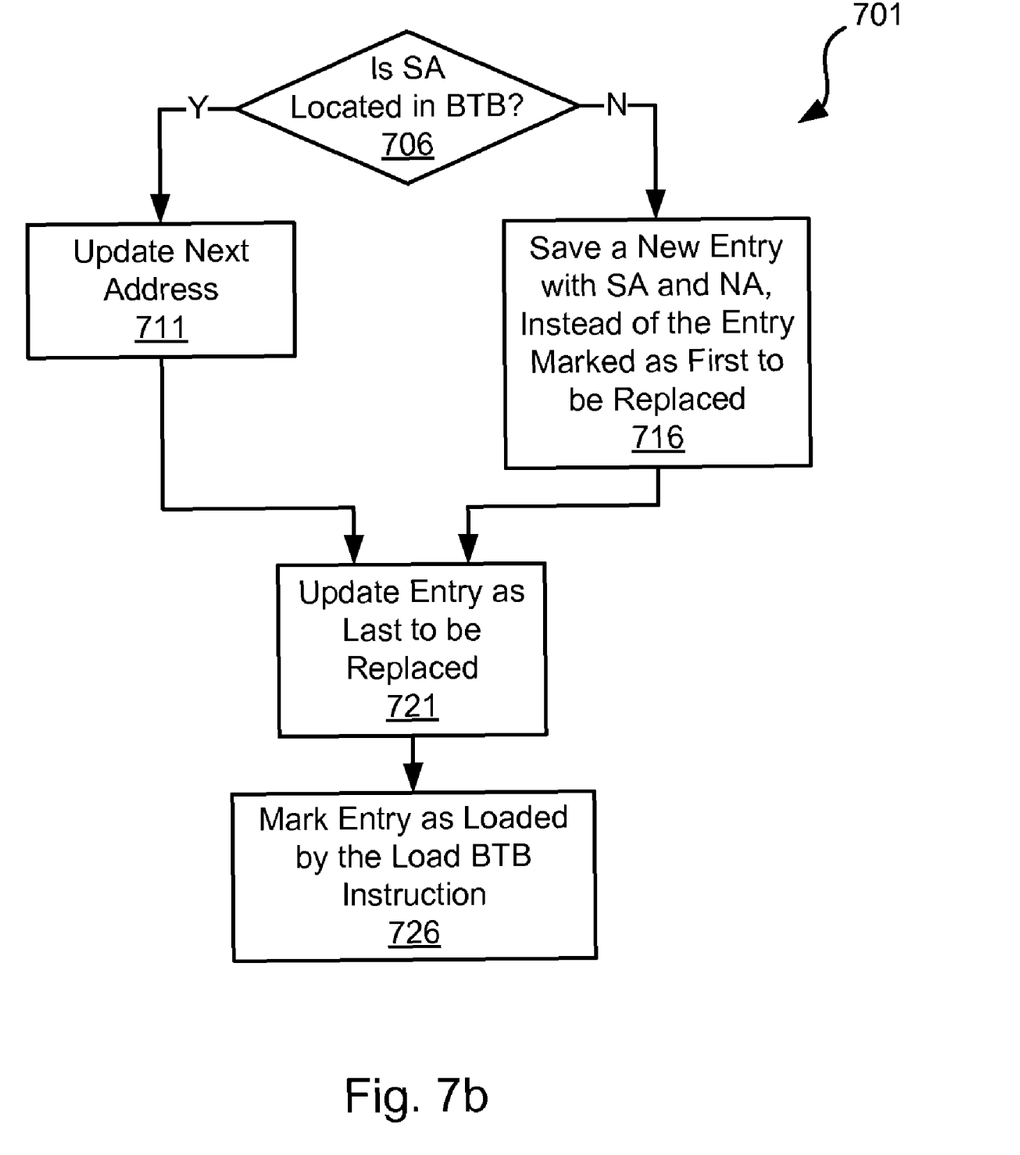

Turning to FIG. 6a, a process flow diagram 600 shows an approach for reordering next address instructions in accordance with various embodiments of the present invention. Following process flow diagram 600, an execution pipeline 610 receives a next instruction to be executed 665. The execution proceeds until an execution output 613 is completed and provided. As the execution process proceeds, the address 617 for the next instruction is calculated. In addition, once the decode process of execution pipeline 610 is completed and it is determined which instruction type is being executed, it is determined whether the currently executing instruction is a load instruction 620. Where it is a load instruction 620, a branch target buffer 630 is informed so that the instruction can be treated differently as more fully described in FIGS. 7 below.

A comparator 640 compares the next address 635 predicted by branch target buffer 630 with the next address 617 expected by execution pipeline 610. Either where the address is the same or where they are different, branch target buffer 630 is updated to reflect the next instruction address and replacement priority 645 of branch target buffer 630. Where comparator 640 indicates that the prediction was wrong 650, execution pipeline 610 is stopped and a new, corrected memory fetch is generated by a memory fetch circuit 660. The updated address is provided to execution pipeline 610 as the next instruction to be executed 665.

Figure 6B:
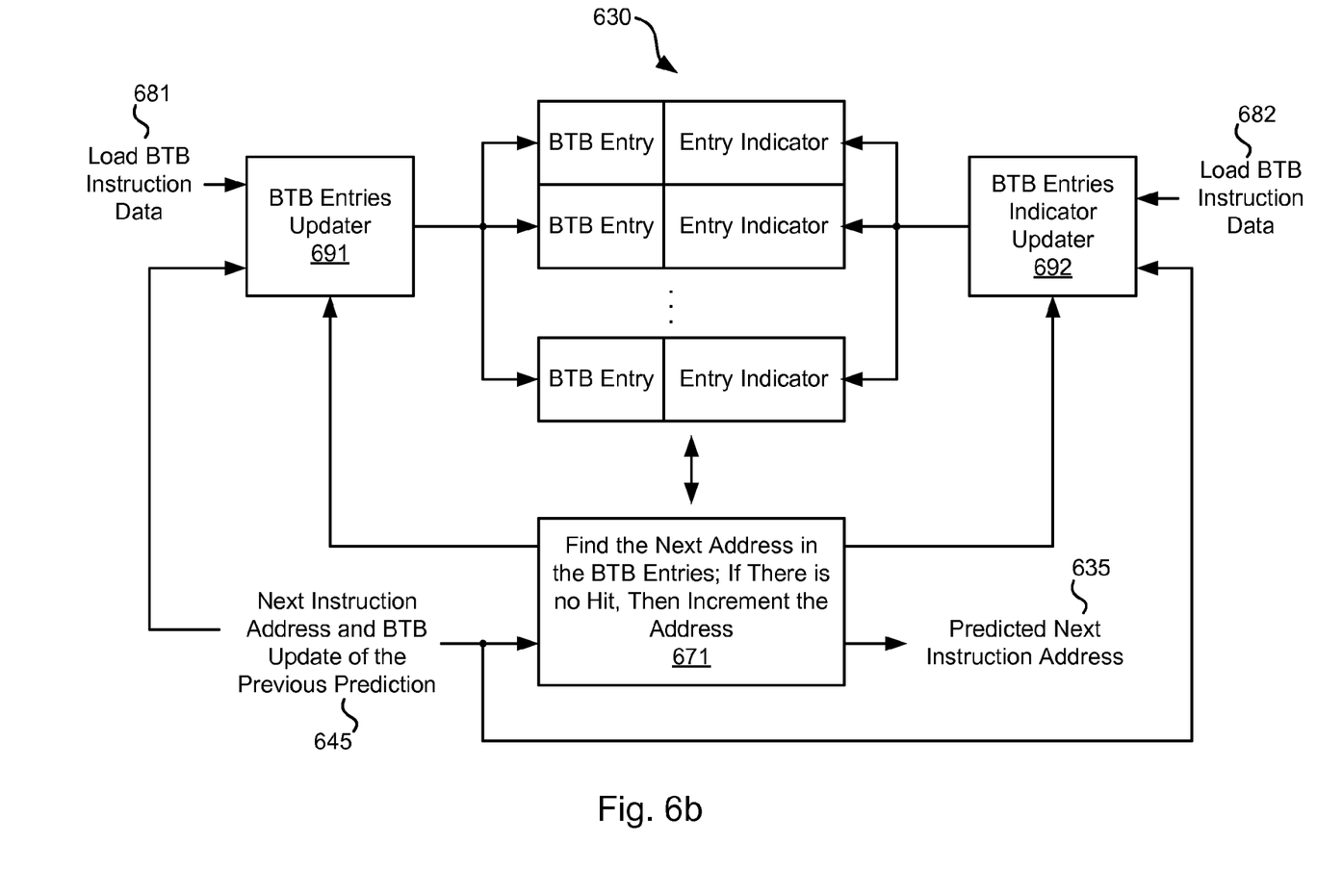

Turning to FIG. 6b, a process diagram shows additional detail regarding the update of branch target buffer 630. Branch target buffer 630 includes a number of branch target buffer entries that each includes an entry indicator. The branch target buffer entry indicates the next entry to be replaced, and the corresponding entry indicator includes the next address for the entry. A branch target buffer entries updater 691 updates the order which each entry in branch target buffer 630 is replaced depending upon whether a new entry is based upon a load instruction 681 or whether it is being updated based upon a recently executed instruction 645. The entry indicator is also updated using a branch target buffer entries indicator updater 692. The entry indicator is updated based upon whether a new entry is based upon a load instruction 682 or whether it is being updated based upon a recently executed instruction 645. A next address module 671 provides a next instruction address 635. Where there is a hit in branch target buffer 630, next instruction address 635 is taken from branch target buffer 630. Alternatively, where there is no hit, next instruction address 635 is an increment of the last executed address.

Turning to FIG. 7a, a flow diagram 700 shows a process for updating the branch target buffer in accordance with various embodiments of the present invention. Following flow diagram 700, it is determined whether the previous address was correctly predicted (block 705). This determination may be done, for example, by comparing the next address predicted by the branch target buffer with the next address expected by the execution pipeline as discussed above in relation to FIG. 6a. Where the previous prediction was correct (block 705) and the source address (SA) of the previous instruction is not in the branch target buffer (block 710), the process ends (block 715). Otherwise, where the previous prediction was correct (block 705) and the source address of the previous instruction is in the branch target buffer (block 710), it is determined whether the instruction was marked as loaded by a load the branch target buffer instruction (block 730).

Where the instruction was not marked as loaded by a load the branch target buffer instruction (block 730), the entry is updated in the branch target buffer as the last to be replaced (block 735) and the entry is marked as loaded by a change of flow instruction (block 745). Otherwise, where the instruction was marked as loaded by a load the branch target buffer instruction (block 730), the entry is updated in the branch target buffer as the first to be replaced (block 740) and the entry is marked as loaded by a change of flow instruction (block 745). This assures relatively quick replacement of loaded entries in comparison to general flow entries.

Where the previous prediction was not correct (block 705) and the source address (SA) of the previous instruction is not in the branch target buffer (block 720), a new entry including the source address and the next address (NA) is saved to the branch target buffer (block 750). This newly added entry is stored in place of the current entry marked as first to be marked as the first to be replaced, and the new entry is marked as last to be replaced (block 755). In addition, the newly added entry is marked as loaded by a change of flow instruction (block 745).

Alternatively, where the previous prediction was not correct (block 705) and the source address (SA) of the previous instruction is in the branch target buffer (block 720), the next address filed of the entry in the branch target buffer is updated to reflect any change in the prediction for the next entry based on the previous execution (block 725). It is then determined whether the instruction was marked as loaded by a load the branch target buffer instruction (block 730). Where the instruction was not marked as loaded by a load the branch target buffer instruction (block 730), the entry is updated in the branch target buffer as the last to be replaced (block 735) and the entry is marked as loaded by a change of flow instruction (block 745). Otherwise, where the instruction was marked as loaded by a load the branch target buffer instruction (block 730), the entry is updated in the branch target buffer as the first to be replaced (block 740) and the entry is marked as loaded by a change of flow instruction (block 745). Again, this assures relatively quick replacement of loaded entries in comparison to general flow entries.

Turning to FIG. 7b, a flow diagram 701 shows the process for updating the branch target buffer based upon a load BTB instruction. Following flow diagram 701, a load BTB instruction is received and it is determined if the source address for the instruction is in the branch target buffer (block 706), Where the source address is in the branch target buffer (block 706), the next address associated with the entry is updated to reflect that in the load BTB instruction (block 711). Otherwise, where the source address is not in the branch target buffer (block 706), a new entry is saved in the branch target buffer (block 716). The new entry replaces the current entry in the branch target buffer that is marked as the first to be replaced. In either case, the modified entry (either updated or newly stored) is marked as the last to be replaced (block 721), and the entry is marked as loaded by the load BTB instruction (block 726).

In conclusion, the invention provides novel systems, devices, methods and arrangements for performing branch prediction. While detailed descriptions of one or more embodiments of the invention have been given above, various alternatives, modifications, and equivalents will be apparent to those skilled in the art without varying from the spirit of the invention. For example, while some embodiments are discussed exclusively in relation to conditional instructions, it will be recognized that such embodiments can be applied to additional instruction types including, but not limited to, change of flow instructions. Therefore, the above description should not be taken as limiting the scope of the invention, which is defined by the appended claims.

What is claimed is:

1. A processor circuit, the processor circuit comprising:
   a program address circuit, wherein the program address circuit includes:
   a branch target buffer, wherein the branch target buffer includes a plurality of entries each associated with a respective change of flow instruction, and wherein each entry includes an indication of an entry source and a next program address corresponding to the respective change of flow instruction; and
   a branch prediction replacement circuit, wherein the branch prediction replacement circuit is operable to determine replacement priorities of the plurality of entries, and wherein the replacement priorities are based at least in part on the entry source for each of the plurality of entries; and
   an execution pipeline, wherein the execution pipeline receives an executable instruction corresponding to one of the next program addresses.

2. The processor circuit of claim 1, wherein the program address circuit further includes:
   a branch prediction circuit, wherein the branch prediction circuit accesses the branch target buffer and selects the next program address from one of the plurality of entries corresponding to an executing change of flow instruction, and wherein the executable instruction corresponding to one of the next program addresses is the selected next program address.

3. The processor circuit of claim 2, wherein the branch prediction circuit updates the next program address for the one of the plurality of entries corresponding to the executing change of flow instruction based at least in part on a branch prediction algorithm.

4. The processor circuit of claim 3, wherein updating the next program address includes setting the entry source for the one of the plurality of entries corresponding to the executing change of flow instruction to indicate the branch prediction circuit.

5. The processor circuit of claim 1, wherein the program address circuit further includes:
   a branch prediction circuit, wherein the branch prediction circuit is operable to load a first entry associated with a first change of flow instruction into the branch target buffer, wherein the next program address of the entry is selected based on a branch prediction algorithm, and wherein the entry source indicates the branch prediction circuit; and
   a branch prediction load circuit, wherein the branch prediction load circuit is operable to load a second entry associated with a second change of flow instruction into the branch target buffer, and wherein the entry source indicates a source other than the branch prediction circuit.

6. The processor circuit of claim 5, wherein the first change of flow instruction is the same as the second change of flow instruction.

7. The processor circuit of claim 5, wherein the branch prediction replacement circuit indicates the replacement priority of the second entry as high priority prior to execution of the second change of flow instruction.

8. The processor of claim 7, wherein a high priority discourages replacement of the second entry.

9. The processor of claim 5, wherein the branch prediction replacement circuit indicates the replacement priority of the second entry as low priority after execution of the second change of flow instruction.

10. The processor of claim 9, wherein a low priority discourages replacement of the second entry.

11. The processor of claim 9, wherein the priority of the first entry is increased upon decreasing the priority of the second entry.

12. The processor of claim 5, wherein the branch prediction replacement circuit indicates the replacement priority of the first entry based upon a replacement algorithm.

13. The processor of claim 11, wherein the replacement algorithm is a least recently used replacement algorithm.

14. A method for branch prediction, the method comprising:
   providing a branch prediction circuit;
   providing a branch prediction load circuit;
   providing a branch target buffer, wherein the branch target buffer includes at least a first entry and a second entry; wherein the first entry corresponds to a first change of flow instruction, includes a first next program address, and includes a first entry source indicating that the first next program address was received from the branch prediction circuit; and wherein the second entry corresponds to a second change of flow instruction, includes a second next program address, and includes a second entry source indicating that the second next program address was received from a source other than the branch prediction load circuit;
   generating a replacement priority for the first entry and the second entry based at least in part on the first entry source and the second entry source; and
   replacing one of the first entry and the second entry in the branch target buffer based at least in part on the replacement priority.

15. The method of claim 14, wherein replacing one of the first entry and the second entry results in replacing the second entry, the method further including:
   receiving a third entry from the branch prediction load circuit, wherein the third entry corresponds to a third change of flow instruction, includes a third next program address, and includes a third entry source indicating that the third next program address was received from a source other than the branch prediction load circuit;
   loading the third entry into the branch target buffer; and
   modifying the replacement priority based at least in part on the third entry source, wherein the replacement priority indicates a priority of the third entry is greater than a priority of the first entry.

16. The method of claim 15, wherein a greater priority encourages replacement of the first entry prior to replacement of the third entry.

17. The method of claim 15, wherein the method further includes:
   executing the third change of flow instruction; and
   modifying the replacement priority based at least in part on the third entry source, wherein the replacement priority indicates the priority of the first entry is greater than the priority of the third entry.

18. The method of claim 14, wherein replacing one of the first entry and the second entry results in replacing the second entry, the method further including:
   receiving a third entry from the branch prediction load circuit, wherein the third entry corresponds to a third change of flow instruction, includes a third next program address, and includes a third entry source indicating that the third next program address was received from the branch prediction load circuit;
   loading the fourth entry into the branch target buffer; and
   modifying the replacement priority using a replacement algorithm applied to the first entry and the third entry.

19. The method of claim 18, wherein the replacement algorithm is a least recently used algorithm, and wherein the replacement priority indicates a priority of the third entry is greater than a priority of the first entry.

20. A computer system, the computer system comprising:
   a processor, wherein the processor includes:
   a program address circuit, wherein the program address circuit includes:
   a branch target buffer;
   a branch prediction circuit, wherein the branch prediction circuit is operable to load a first entry associated with a first change of flow instruction into the branch target buffer, wherein the next program address of the entry is selected based on a branch prediction algorithm, and wherein an entry source indicates the branch prediction circuit; and
   a branch prediction load circuit, wherein the branch prediction load circuit is operable to load a second entry associated with a second change of flow instruction into the branch target buffer, and wherein the entry source indicates a source other than the branch prediction circuit;
   a branch prediction replacement circuit, wherein the branch prediction replacement circuit is operable to determine a replacement priority of the first entry and the second entry, wherein the replacement priority indicates that the first entry should be replaced before the second entry prior to execution of the second change of flow instruction, and wherein the replacement priority indicates that the second entry should be replaced before the first entry after execution of the second change of flow instruction; and a computer readable medium, wherein the computer readable medium includes the first change of flow instruction and the second change of flow instruction.

* * * * *